(12) United States Patent
Idei et al.

(10) Patent No.: US 7,922,963 B2
(45) Date of Patent: Apr. 12, 2011

(54) METHOD FOR INSPECTING HONEYCOMB STRUCTURED BODY AND METHOD FOR MANUFACTURING HONEYCOMB STRUCTURED BODY

(75) Inventors: Toru Idei, Courtenay (FR); Norio Suzuki, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 950 days.

(21) Appl. No.: 11/651,562

(22) Filed: Jan. 10, 2007

(65) Prior Publication Data
US 2007/0175060 A1   Aug. 2, 2007

(30) Foreign Application Priority Data
Jan. 30, 2006   (WO) ................. PCT/JP2006/301461

(51) Int. Cl.
*B28B 3/20* (2006.01)
*G01B 21/00* (2006.01)

(52) U.S. Cl. ............ 264/630; 264/631; 33/549; 33/551; 33/552; 33/553; 33/554; 33/555

(58) Field of Classification Search ................. 264/630, 264/631; 33/549, 551, 552, 553, 554, 555, 33/701
See application file for complete search history.

(56) References Cited

U.S. PATENT DOCUMENTS

| | | | |
|---|---|---|---|
| 5,237,860 A * | 8/1993 | Kato et al. ................. | 73/105 |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,343,690 B2 * | 3/2008 | Sato et al. ................. | 33/552 |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |

(Continued)

FOREIGN PATENT DOCUMENTS

EP   1 598 102   11/2005

(Continued)

OTHER PUBLICATIONS

Extended European Search Report dated Mar. 1, 2007, of EP 06023076.0 (6 pages).

(Continued)

*Primary Examiner* — Matthew J Daniels
*Assistant Examiner* — Russell J Kemmerle, III
(74) *Attorney, Agent, or Firm* — Finnegan, Henderson, Farabow, Garrett & Dunner, LLP

(57) ABSTRACT

A method for inspecting a honeycomb structured body of the present invention is a method for inspecting a honeycomb structured body comprising a pillar-shaped honeycomb fired body having a multitude of cells placed in parallel with one another in the longitudinal direction with a cell wall therebetween, the method comprising: measuring the shape of the honeycomb structured body in the longitudinal direction through preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body.

8 Claims, 8 Drawing Sheets

U.S. PATENT DOCUMENTS

| | | |
|---|---|---|
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0043562 A1 | 3/2006 | Watanabe |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144024 A1* | 6/2007 | Sato et al. ........................ 33/554 |
| 2007/0169453 A1 | 7/2007 | Hayakawa |
| 2007/0178275 A1 | 8/2007 | Takahashi |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0235895 A1 | 10/2007 | Yamamura |
| 2007/0243283 A1 | 10/2007 | Yamamura |
| 2007/0262497 A1 | 11/2007 | Yamamura |
| 2007/0262498 A1 | 11/2007 | Saijo |
| 2007/0293392 A1 | 12/2007 | Ohno et al. |
| 2008/0067725 A1 | 3/2008 | Naruse |
| 2008/0084010 A1 | 4/2008 | Naruse |
| 2008/0088072 A1 | 4/2008 | Kobayashi |
| 2008/0106008 A1 | 5/2008 | Kasai |
| 2008/0106009 A1 | 5/2008 | Naruse |
| 2008/0111274 A1 | 5/2008 | Kawai |
| 2008/0115597 A1 | 5/2008 | Ohno |
| 2008/0116200 A1 | 5/2008 | Kawai |
| 2008/0116601 A1 | 5/2008 | Naruse |
| 2008/0120950 A1 | 5/2008 | Ohno et al. |
| 2008/0136053 A1 | 6/2008 | Kuribayashi |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

FOREIGN PATENT DOCUMENTS

| | | | |
|---|---|---|---|
| EP | 1 688 703 | | 8/2006 |
| JP | UM 62-128308 | | 8/1987 |
| JP | UM 63-145103 | | 9/1988 |
| JP | 02-002901 | | 1/1990 |
| JP | UM 02-128902 | | 10/1990 |
| JP | 2002-267427 | | 9/2002 |
| WO | WO 2005/052503 | * | 6/2005 |

OTHER PUBLICATIONS

U.S. Appl. No. 11/711,021.
U.S. Appl. No. 11/951,949.
U.S. Appl. No. 11/845,975.
U.S. Appl. No. 11/867,256.
U.S. Appl. No. 11/174,483, filed Jul. 6, 2005, Saijo et al.
U.S. Appl. No. 11/225,197, filed Sep. 14, 2005, Yamada.
U.S. Appl. No. 11/513,115, filed Aug. 31, 2006, Kawai et al.
U.S. Appl. No. 11/541,724, filed Oct. 3, 2006, Yamada.
U.S. Appl. No. 11/546,417, filed Oct. 12, 2006, Kawai et al.
U.S. Appl. No. 11/604,682, filed Nov. 28, 2006, Saijo et al.
U.S. Appl. No. 11/606,167, filed Nov. 30, 2006, Yamamura et al.
U.S. Appl. No. 11/636,460, filed Dec. 11, 2006, Naruse et al.
U.S. Appl. No. 11/638,433, filed Dec. 14, 2006, Yamada.
U.S. Appl. No. 11/645,544, filed Dec. 27, 2006, Kawai et al.
U.S. Appl. No. 11/606,173, filed Nov. 30, 2006, Hoshino et al.
Related Case List.

* cited by examiner

A-A line cross-sectional view

METHOD FOR INSPECTING HONEYCOMB STRUCTURED BODY AND METHOD FOR MANUFACTURING HONEYCOMB STRUCTURED BODY

CROSS-REFERENCE TO RELATED APPLICATIONS

This application claims priority of PCT/JP2006/301461 filed on Jan. 30, 2006. The contents of this application are incorporated herein by reference in their entirety.

BACKGROUND OF THE INVENTION

1. Field of the Invention

The present invention relates to a method for inspecting a honeycomb structured body and a method for manufacturing a honeycomb structured body.

2. Discussion of the Background

Harm to the environment and the human body caused by particulates such as soot contained in exhaust gas discharged from the internal combustion engines of buses, trucks and other vehicles, construction equipment and the like has recently become a problem. For this reason, there are currently proposed numerous kinds of honeycomb filters using a honeycomb structured body comprising porous ceramic as a filter for capturing particulates contained in exhaust gas, thereby purifying the exhaust gas.

FIG. 1 is a perspective view schematically showing an example of embodiments of such a honeycomb structured body. FIG. 2A is a perspective view schematically showing a honeycomb fired body which comprises the above-mentioned honeycomb structured body, while FIG. 2B is a cross-sectional view of the line A-A therein.

In a honeycomb structured body 130, a plurality of honeycomb fired bodies 140, of the kind shown in FIGS. 2A and 2B, are bound together by interposing a sealing material layer (an adhesive layer) 131 forming a ceramic block 133, and a sealing material layer (a coat layer) 132 is formed over the outer periphery of the ceramic block 133.

And comprising the honeycomb fired body 140 are, as shown in FIGS. 2A and 2B, a multitude of cells 141 placed in parallel with one another in the longitudinal direction, and cell walls 143, which partition the cells 141 individually, and provide filtration functionality.

More specifically, as shown in FIG. 2B, the end portion of either the exhaust gas inlet side or the exhaust gas outlet side of the cells 141 formed in the honeycomb fired body 140 is sealed by a plug material layer 142. Therefore, the exhaust gas which enters one cell 141 will always pass through the cell wall 143 dividing the cells 141, to flow out through another one of the cells 141. When the exhaust gas passes through the cell wall 143, particulates contained within the exhaust gas are captured by the cell wall 143, thereby purifying the exhaust gas.

Conventionally, when manufacturing such a honeycomb structured body 130, for instance, first a ceramic powder, a binder, and a liquid dispersal medium are combined to prepare a wet mixture. Using a die, the wet mixture is continuously extraction molded, and the extruded molded body is then cut to a prescribed length to manufacture a rectangular pillar-shaped honeycomb molded body.

Next, the honeycomb molded body attained above is dried, and afterward, plugs are injected into either end of prescribed cells using the plug material layer in order to achieve a sealed state of the cells. After the sealed state has been achieved, degreasing and firing treatment is carried out, thus manufacturing the honeycomb fired body.

Afterward, a sealing material paste is applied onto the sides of the honeycomb fired body, and the honeycomb fired bodies are adhered together using the sealing material paste. This state of a multitude of the honeycomb fired bodies being bound together by interposing a sealing material layer (the adhesive layer) effectuates an aggregated body of honeycomb fired body. Excision is then carried out on the achieved aggregated body of honeycomb fired bodies using a cutting machine or the like to achieve a ceramic block of a prescribed shape, such as a cylindrical or cylindroid shape or the like. Finally, a sealing material paste is applied over the outer periphery of the ceramic block to form a sealing material layer (the coat layer), thereby completing the manufacture of the honeycomb structured body.

The honeycomb structured body of the sort described herein above (ceramic filters or catalyst supporting carrier) is normally stored within a casing for use. Because of this, before storing the honeycomb structured body within the casing, it is necessary to inspect whether or not the manufactured honeycomb structured body has the prescribed shape fitting to the above-mentioned casing.

At this point, there is disclosed a method (Reference Patent Document 1 for instance) of, for instance, photographing the exterior shape (the end face) of the honeycomb structured body to acquire an original image, and applying image processing to this original image to measure the exterior shape of the honeycomb structured body as a method for inspecting the shape of the manufactured honeycomb structured body (see for example JP-A 2002-267427).

The contents of JP-A 2002-267427 are incorporated herein by reference in their entirety.

SUMMARY OF THE INVENTION

The method for inspecting a honeycomb structured body of the present invention is a method for inspecting a honeycomb structured body comprising a pillar-shaped honeycomb fired body having a multitude of cells placed in parallel with one another in the longitudinal direction with a cell wall therebetween, the method comprising: measuring the shape of the honeycomb structured body in the longitudinal direction through preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body.

In the above-mentioned method for inspecting of the present invention, it is preferable that a honeycomb structured body which is an object of inspection be configured by bonding a plurality of the honeycomb fired bodies together by interposing an adhesive layer.

It is also preferable, in the above-mentioned method for inspecting, that a honeycomb structured body which is an object of inspection be constituted by a single piece of the honeycomb fired body.

It is also preferable, in the above-mentioned method for inspecting, that an inspection item concerning the shape of the honeycomb structured body in the longitudinal direction includes at least one item selected from the group consisting of the length in the longitudinal direction, the degree of parallelism and the degree of position.

It is also preferable that the above-mentioned contact measurement apparatus includes a plurality of measurement probes.

It is also preferable that the shape of a tip of the above-mentioned contacting probe be a planar shape obtained by cutting the tip with a plane perpendicular to the length direction of the above-mentioned rail.

It is also preferable that the movement speed of the measurement probe upon moving the measurement probe in a direction nearing the reference surface be at least about 5 cm/s and at most about 50 cm/s.

It is also preferable, in the above-mentioned method for inspecting, to carry out the measurement of shape of the honeycomb structured body in a direction perpendicular to the longitudinal direction in addition to the longitudinal direction, by combining a plurality of the contact measurement apparatuses.

The method for manufacturing a honeycomb structured body of the present invention is a method for manufacturing a honeycomb structured body, comprising: molding ceramic raw materials to manufacture a pillar-shaped honeycomb molded body having a multitude of cells placed in parallel in the longitudinal direction with a cell wall therebetween; firing the honeycomb molded body to manufacture a honeycomb structured body comprising a honeycomb fired body; and inspecting the shape of the honeycomb structured body, wherein the inspection of the shape of the honeycomb structured body comprises measuring the shape of the honeycomb structured body in the longitudinal direction through: preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body.

In the method for manufacturing a honeycomb structured body of the present invention, because inspection of the shape of a honeycomb structured body is carried out according to the above-mentioned method for inspecting, it may become easier to attain information regarding the shape of a honeycomb structured body in the longitudinal direction in a short period of time and accurately, it may become easier to accurately and in a short period of time determine whether or not a manufactured honeycomb structured body is in compliance with a product specification.

In the above-mentioned method for manufacturing a honeycomb structured body of the present invention, it is preferable that a honeycomb structured body which is an object of inspection be configured by bonding a plurality of the honeycomb fired bodies together by interposing an adhesive layer.

It is also preferable, in the above-mentioned method for manufacturing, that a honeycomb structured body which is an object of inspection be constituted by a single piece of the honeycomb fired body.

It is also preferable, in the above-mentioned method for manufacturing, that an inspection item concerning the shape of the honeycomb structured body in the longitudinal direction includes at least one item selected from the group consisting of the length in the longitudinal direction, the degree of parallelism and the degree of position.

It is also preferable that the above-mentioned contact measurement apparatus includes a plurality of measurement probes.

It is also preferable that the shape of a tip of the contacting probe be a planar shape obtained by cutting the tip with a plane perpendicular to the length direction of the rail.

It is also preferable that the movement speed of the measurement probe upon moving the measurement probe in a direction nearing the reference surface be at least about 5 cm/s and at most about 50 cm/s.

It is also preferable, in the above-mentioned method for manufacturing, to carry out the measurement of shape of the honeycomb structured body in a direction perpendicular to the longitudinal direction in addition to the longitudinal direction, by combining a plurality of the contact measurement apparatuses.

It is also preferable that the method for manufacturing of the present invention comprise sealing either one of the end portions of the above-mentioned multitude of cells with plug material paste.

BRIEF DESCRIPTION OF THE DRAWINGS

FIGS. 4A-1, 4A-2, and 4A-3 are schematic views showing a process in a method for inspecting representing a measurement principle of the present invention in a case using a contact measurement apparatus including a single measurement probe; FIGS. 4B-1, 4B2, and 4B-3 are schematic views showing another process in a method for inspecting representing a measurement principle of the present invention in a case using a contact measurement apparatus including a single measurement probe; and FIGS. 4C-1, 4C-2, and 4C-3 are schematic views showing a measurement principle of the present invention in a case using a contact measurement apparatus including a plurality of measurement probes.

DESCRIPTION OF THE EMBODIMENTS

Figure 1:
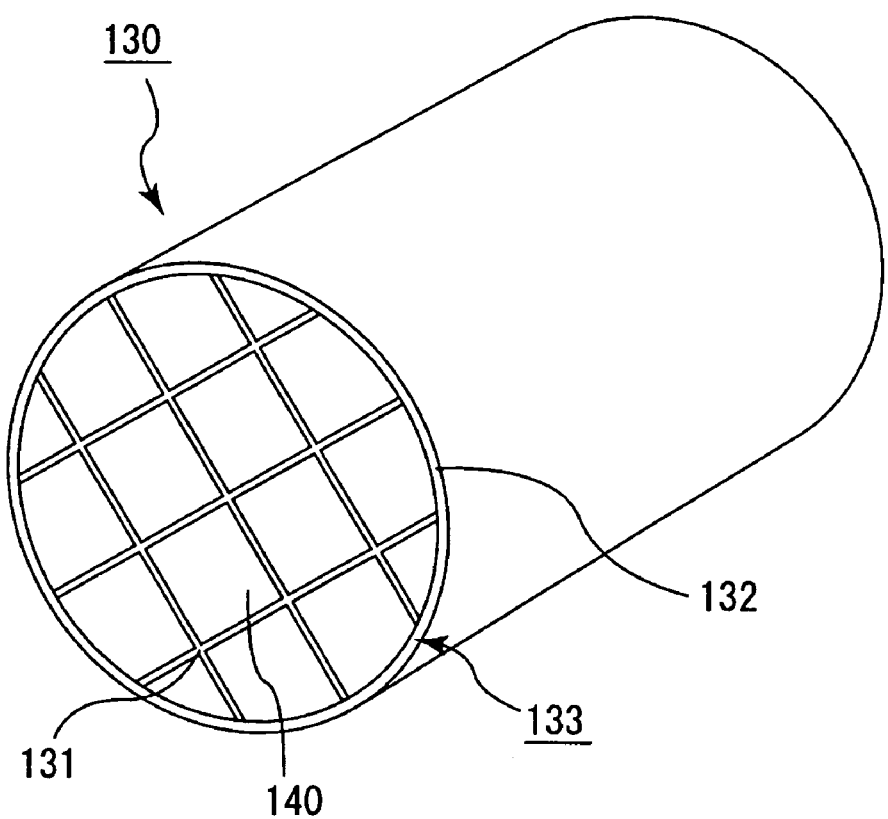
FIG. 1 is a perspective view schematically showing an example of one embodiment of a honeycomb structured body.

First of all, description will be given with regard to the method for inspecting a honeycomb structured body according to the embodiments of the present invention using the drawings as a reference.

The method for inspecting a honeycomb structured body according to the embodiments of the present invention is a method for inspecting a honeycomb structured body comprising a pillar-shaped honeycomb fired body having a multitude of cells placed in parallel with one another in the longitudinal direction with a cell wall therebetween, the method comprising: measuring the shape of the honeycomb structured body in the longitudinal direction through preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body.

In accordance with the method for inspecting a honeycomb structured body according to the embodiments of the present invention, since the only requirement for measuring the shape of the honeycomb structured body is to contact a contacting probe constituting the measurement probe with an end face of the honeycomb structured body, measurement conditions have little influence on the measurement results, and therefore measurement errors may be reduced more easily. Moreover, because evaluation of the shape of the honeycomb structured body along the longitudinal direction tends to be carried out more accurately and easily, and in a short period of time, it may become easier to shorten the amount of time required in inspection of a honeycomb structured body. Hereby, it may become easier to accurately and in a short period of time determine which honeycomb structured bodies are in compliance with a product specification.

Although the shape of the tip of the contacting probe on the side configured to contact with the end face of the honeycomb structured body is not particularly limited, it is preferable that the shape is not one taking on round features, or is sharply edged, but a planar shape attained by cutting the tip of the contacting probe with a plane perpendicular in relation to the length direction of the rail.

When the shape of the tip of the contacting probe is a planar shape of a plane perpendicular to the rail, it may become easier to accurately measure the shape of the honeycomb structured body in the longitudinal direction.

In the method for inspecting a honeycomb structured body according to the embodiments of the present invention, the honeycomb structured body which is an object of inspection invention may be either of the aggregated honeycomb structured body or the integral honeycomb structured. Out of the two, it is particularly preferable that the honeycomb structured body of a plurality of honeycomb fired bodies bonded together by interposing an adhesive layer (i.e. the aggregated honeycomb structured body) be the object of inspection.

In a case in which the object of inspection is the aggregated honeycomb structured body, in the method for inspecting a honeycomb structured body according to the embodiments of the present invention, measurement of the shape in the longitudinal direction of the above-mentioned honeycomb structured body having surface unevenness tends to be carried out more easily and accurately, by just moving the measurement probe relatively in a direction nearing the reference surface. Therefore, it may become easier to suitably make even an aggregated honeycomb structured body having a complicated end face structure as the object of inspection.

In the method for inspecting according to the embodiments of the present invention, a honeycomb structured body comprised of a pillar-shaped honeycomb fired body having a shape such as a round, oval or polygonal pillar of a multitude of cells placed in parallel with one another in the longitudinal direction with a cell wall therebetween is made the object for inspection.

Figure 2A:
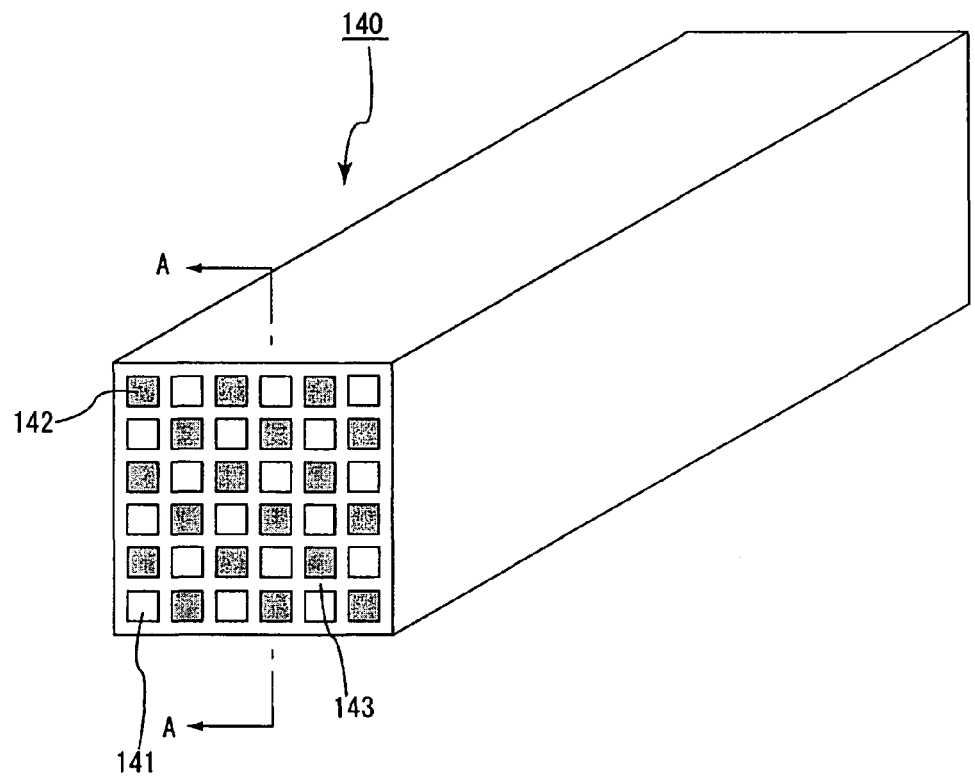
FIG. 2A is a perspective view schematically showing a honeycomb fired body constituting a honeycomb structured body.
Figure 2B:
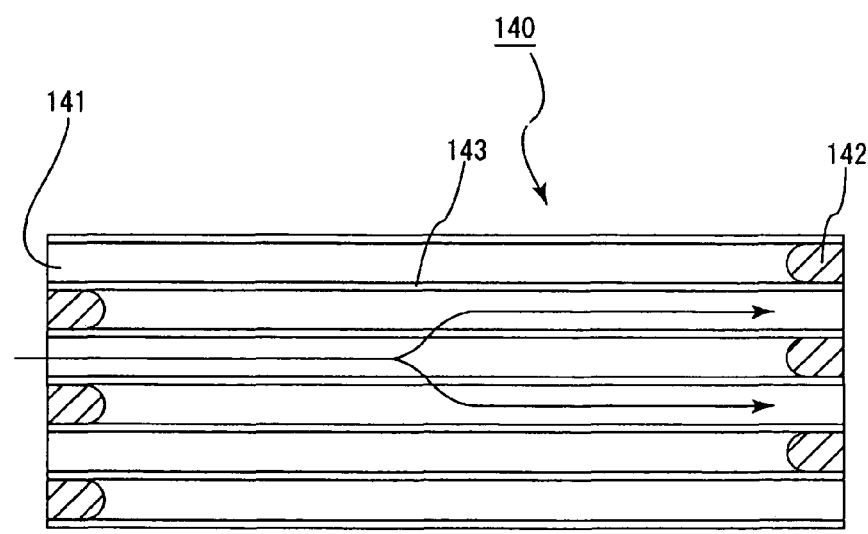
FIG. 2B is a cross-sectional view taken along line A-A of FIG. 2A.
Figure 3:
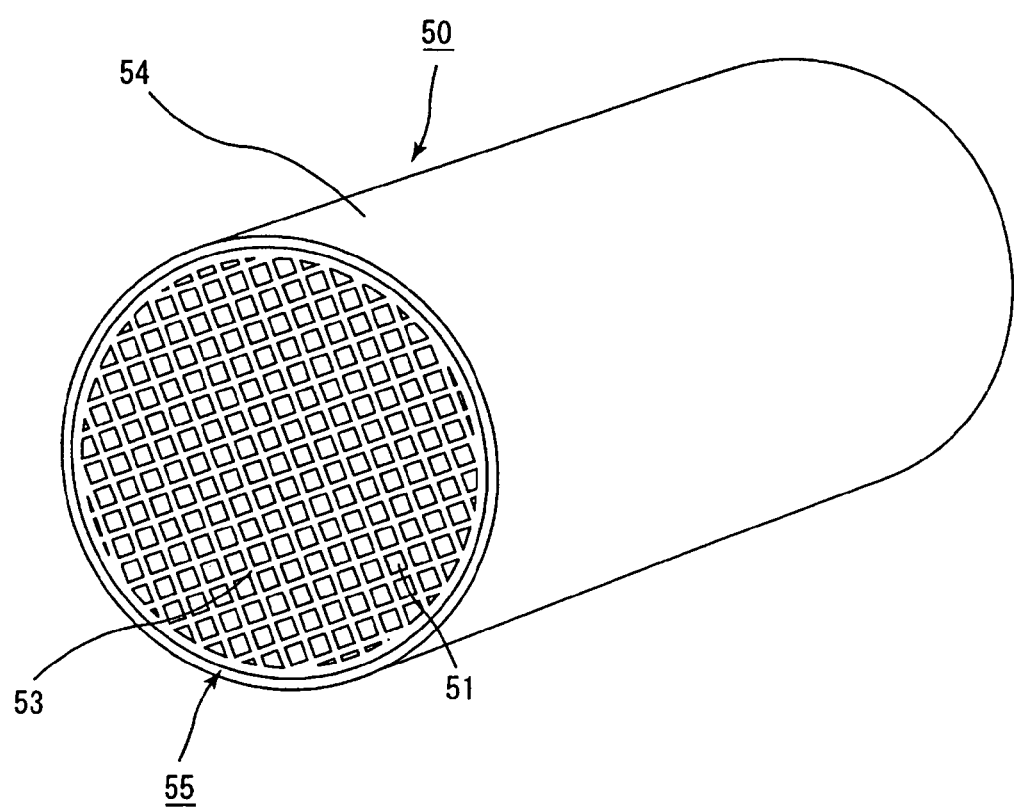
FIG. 3 is a perspective view schematically showing an example of another embodiment of a honeycomb structured body.

Examples of the above-mentioned honeycomb structured body include, for instance, a honeycomb structured body 130 (herein after also termed as 'aggregated honeycomb structured body') having a configuration of a plurality of honeycomb fired bodies 140 bonded together by interposing a sealing material layer (the adhesive layer) 131 and a sealing material layer (the coat layer) 132 formed thereon the outer periphery, as has already been described using FIGS. 1, 2A and 2B as a reference, or, a honeycomb structured body 50 (herein after also termed as 'integral honeycomb structured body') of a cylindrical ceramic block 55 constituted from a single honeycomb fired body, as shown in FIG. 3. Either or the above-mentioned honeycomb structured bodies may be suitably made the object for the measurement of the shape in the longitudinal direction according to the method for inspecting according to the embodiments of the present invention. Moreover, in FIG. 3, the symbol 51 corresponds to a cell, 53 to a cell wall, and 54 to a sealing material layer (the coat layer).

Moreover, the 'longitudinal direction of the honeycomb structured body' refers to the direction parallel with respect to the direction in which the cells are formed. Thus, regardless even if the value of the diameter of the end face is greater in comparison to the value of the length of the honeycomb structured body along the direction in which the cells are formed, the direction parallel to the direction in which the cells are formed is still termed the 'longitudinal direction of the honeycomb structured body'.

Moreover, in this specification of the present invention, among the faces making up the exterior shape of the honeycomb molded body, the honeycomb fired body, and the honeycomb structured body, faces at which the cells are exposed are termed the 'end face', and faces other than the end faces are termed the 'side face'.

FIGS. 4A-1, 4A-2, and 4A-3 are schematic views showing a process in a method for inspecting representing a measurement principle of the present invention in a case using a contact measurement apparatus including a single measurement probe. FIGS. 4B-1, 4B2, and 4B-3 are schematic views showing another process in a method for inspecting representing a measurement principle of the present invention in a case using a contact measurement apparatus including a single measurement probe. FIGS. 4C-1, 4C-2, and 4C-3 are schematic views showing a measurement principle of the present invention in a case using a contact measurement apparatus including a plurality of measurement probes. Moreover, a coordinate axis having the upward vertical direction as positive direction is established for each of the Figures.

Figures 3, 4A:
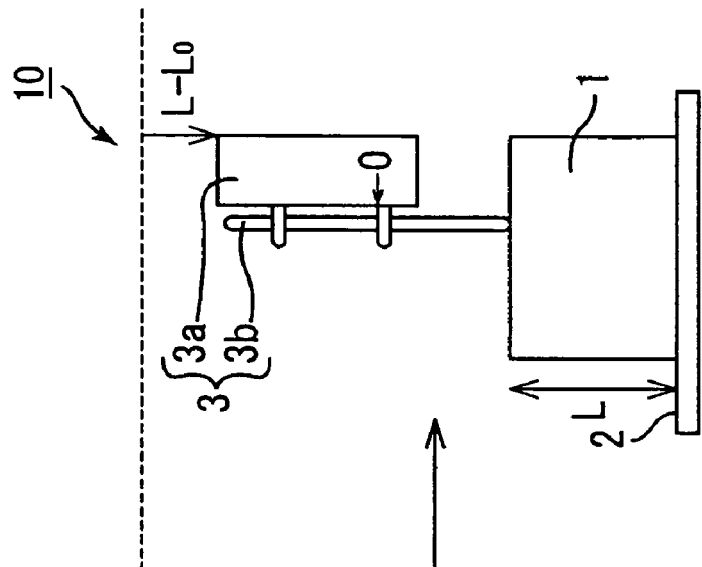

As is shown in FIG. 4A-1, a contact measurement apparatus 10 used in the method for inspecting a honeycomb structured body according to the present invention includes a reference surface 2 and a measurement probe 3 disposed above the reference surface 2. The measurement probe 3 is constituted by a rail 3a disposed perpendicularly with respect to the reference surface 2, and a contacting probe 3b configured to move along the rail 3a. Therefore, the direction of movement of the contacting probe 3b is perpendicular with respect to the reference surface 2. Moreover, description of a standard sample S used when carrying out a 0 point adjustment of the contact measurement apparatus 10 will be put forth herein below.

Moreover, it is also acceptable that a measurement probe support plate able to support and move the measurement probe 3 perpendicularly with respect to the reference surface 2, a support member such as a ball screw and the like for the purpose of moving this measurement probe support plate, and a displacement gauge for the purpose of measuring the amount of movement of the measurement probe 3 be installed therein the contact measurement apparatus. These members will be described hereinbelow. Moreover, it is acceptable that a scale or a sensor for the purpose of measuring of the amount of movement of the contacting probe 3b be installed therein the measurement probe 3.

Next, description will be put forth regarding a procedure of the method for inspecting a honeycomb structured body according to the embodiments of the present invention using the drawings as a reference.

Firstly, before measuring of the shape of the honeycomb structured body in the longitudinal direction, a 0 point adjustment of the contact measurement apparatus 10 is carried out. Here, the '0 point adjustment' refers to, in the measurement system containing the reference surface and the measurement probe, a procedure of deciding a position of origin of the measurement probe in relation to the reference surface, and a position of origin of the contacting probe in relation to the rail. In the method for inspecting a honeycomb structured body of the present invention, by detecting the relative amount of movement of the measurement probe and/or the contacting probe from the position of origin decided in the 0 point adjustment, and seeking the coordinate location in the measurement system from the detected amount of movement, measurement of the shape and the like of a sample is carried out.

Specifically, the 0 point adjustment is carried out in the following manner.

As shown in FIG. 4A-1, one end face of the standard sample S is contacted with the reference surface 2. The ends of the standard sample S are parallel to each other, and are calibrated such that the length (height) between end faces is $L_0$. Thereby, no matter on which point of the top face of the standard sample S in the state shown in FIG. 4A-1 measurement of length is carried out, the length in between the above-mentioned top face and the reference surface 2 will all be $L_0$.

Next, the measurement probe 3 is moved in a direction nearing the reference surface 2, and the contacting probe 3b is brought into contact with the other end face of the standard sample S as is shown in FIG. 4A-1. The position of the measurement probe 3 in relation to the reference surface 2 at this time, and the position of the contacting probe 3b in relation to the rail 3a are each recorded as the position of origin, whereby the 0 point adjustment of the contact measurement apparatus 10 is then carried out. Here, the length of the tip of the contacting probe 3b to the reference surface 2 is $L_0$.

In the FIGS. 4A-1, 4A-2, and 4A-3, although, for the sake of convenience of description, the position of upper edge of the measurement probe 3 is the position of origin of the measurement probe 3 and the position of '0' shown above the rail 3a is the position of origin of the contacting probe 3b, they are not limited to such examples, as it is acceptable to decide on positions of origin in arbitrary positions.

Figures 2, 4A:
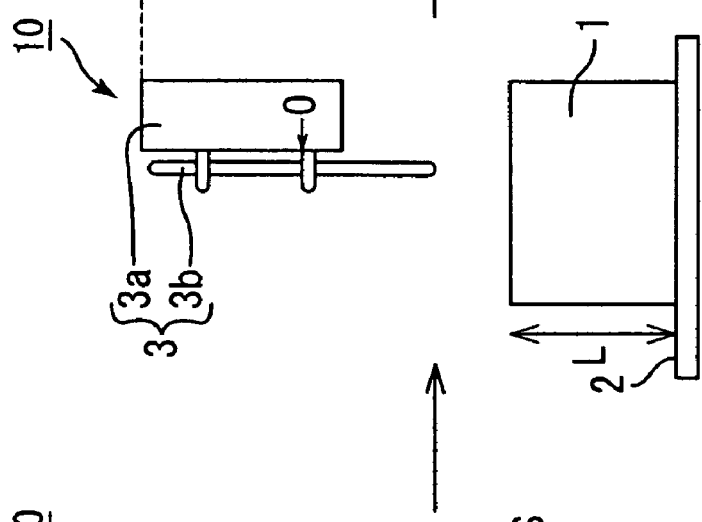
Figures 1, 4A:
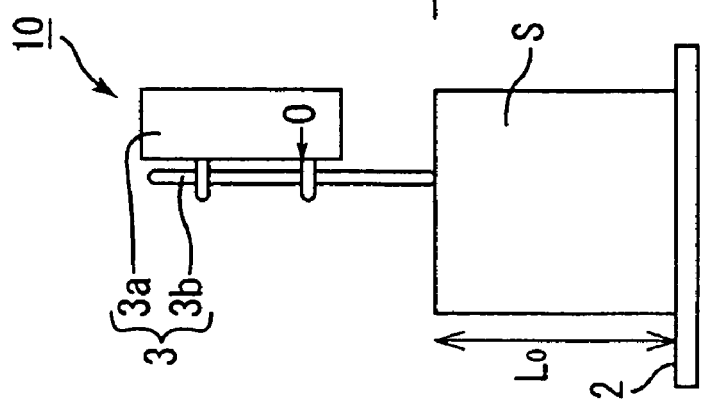

Secondly, as shown in FIG. 4A-2, after the 0 point adjustment, one end face of a honeycomb structured body 1 is brought into contact with the reference surface 2 for the purpose of measuring the shape of honeycomb structured body 1 (in the longitudinal direction) which is the object of measurement. Here, it is acceptable that the length of the standard sample S be either longer than the length of the longitudinal direction of the honeycomb structured body 1 or shorter than the length of the longitudinal direction of the honeycomb structured body 1, however it is desirable that the length of the standard sample S be longer than the length of the longitudinal direction of the honeycomb structured body 1. This is because if the length of the standard sample S is longer than the length of the longitudinal direction of the honeycomb structured body 1, when carrying out measurement it will be sufficient to just move the measurement probe 3 from the position of origin (of the measurement probe 3 of after 0 point adjustment) in only the direction nearing the reference surface 2.

Thirdly, as shown in FIG. 4A-3, by moving the measurement probe 3 in a direction nearing the reference surface 2 and contacting the contacting probe 3b with the other end face of the honeycomb structured body 1, measurement of the shape of the honeycomb structured body 1 in the longitudinal direction is carried out.

When moving the measurement probe 3, the length of the longitudinal direction of the honeycomb structured body 1 (which is the object of measurement) is taken as 'L', and the measurement probe 3 is moved in a direction nearing the reference surface 2 only an amount of a value ($L-L_0$) attained when the length $L_0$ of the standard sample S is subtracted from the length L of the longitudinal direction of the honeycomb structured body.

The above-mentioned value ($L-L_0$) is a negative value while the upward vertical direction of the coordinate axis applied in the measurement system is a positive direction. Because of this, the negative direction, that is, the lower vertical direction of the coordinate axis, is the direction in which the measurement probe 3 is moved, and the measurement probe 3 is only moved the amount of the absolute value of ($L-L_0$) therein.

Moreover, the length L of the longitudinal direction of the above-mentioned honeycomb structured body is a setting value input into the contact measurement apparatus 10 on the occasion of measurement, not an actual measurement value. More specifically for instance, when the length L of the longitudinal direction of a honeycomb structured body is 100 mm, this value of 100 mm is not an actual measurement value, it is a length value required for the honeycomb structured body such as a product specification value, or, it is a value that has increased or decreased by a prescribed amount from this length. The amount of movement of the measurement probe 3 in the contact measurement apparatus 10 is decided based on this value, and the measurement probe 3 is then moved only the decided amount during measurement.

Herein below, for the sake of simple and clear description, description will be put forth in regard to a case employing the value of the length required for the honeycomb structured body, as the length L (the setting value) of the longitudinal direction of the above-mentioned honeycomb structured body of during measurement.

As was set forth herein above, if the length of the longitudinal direction of the honeycomb structured body 1 is L, then the amount of movement of the measurement probe 3 is ($L-L_0$). And, when the measurement probe 3 has been moved only the amount of the value ($L-L_0$) in a direction nearing the reference surface 2, the position of the tip of the contacting probe 3b is the position separated from the reference surface 2 by only L. At this point, in a case in which the actual length of the longitudinal direction of the honeycomb structured body 1 is L, if the measurement probe 3 is moved only the amount of the value ($L-L_0$), the contacting probe 3b and the end face of the top side of the honeycomb structured body 1 will contact to each other precisely. Therefore, the displacement from the position of origin of the contacting probe 3b in relation to the rail 3a is 0, and it is thereby confirmed that the actual length of the longitudinal direction of the honeycomb structured body 1 is indeed L (See FIG. 4A-3).

On the other hand, description of the measurement method will be put forth in regard to a case in which the actual length of the longitudinal direction of the honeycomb structured body 1 is (L+Z) while referencing FIGS. 4B-1, 4B-2, and 4B-3.

Figures 3, 4B:
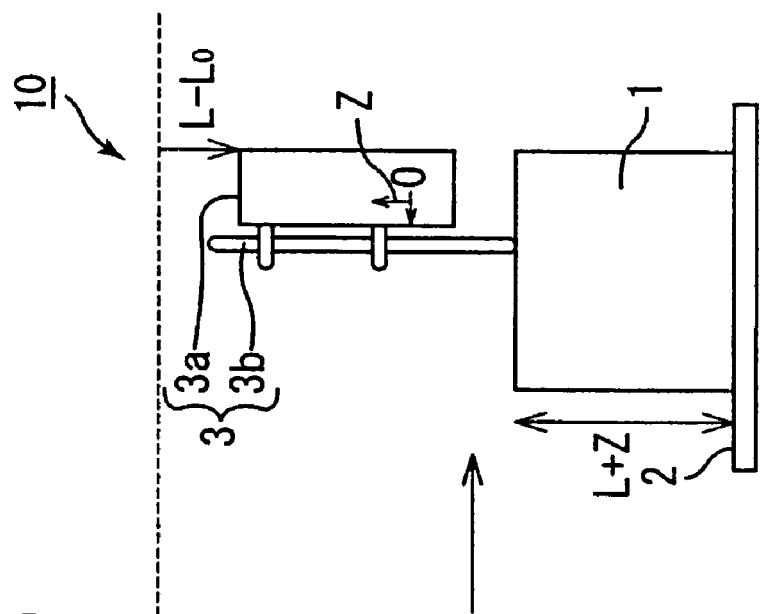
Figures 2, 4B:
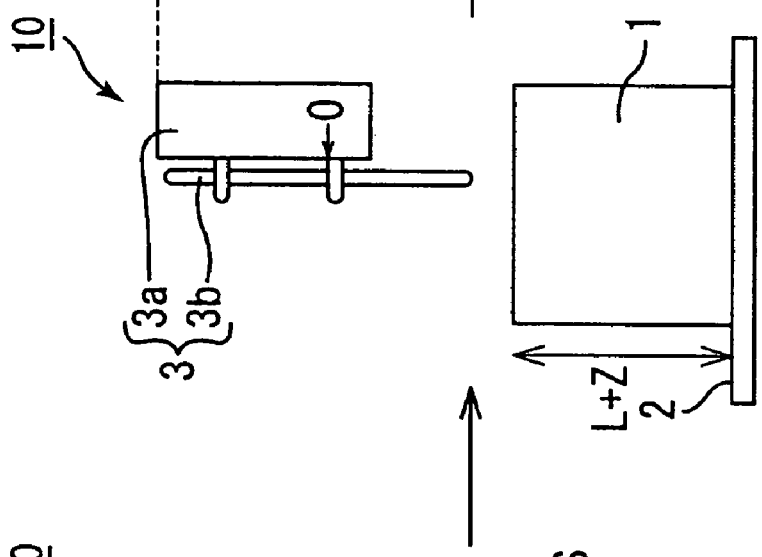
Figures 1, 4B:
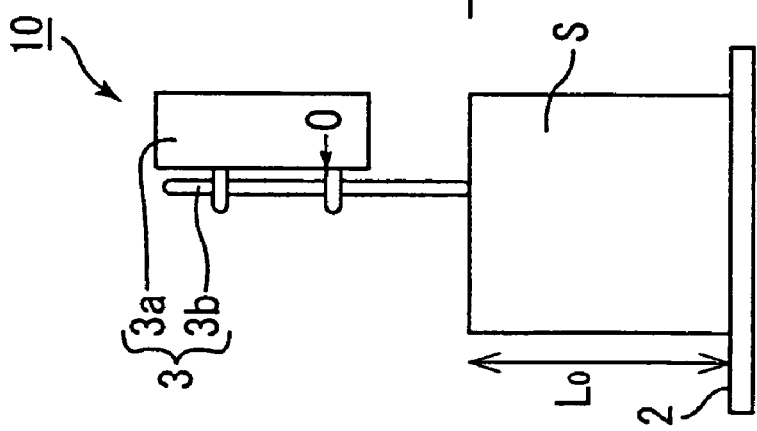

First, a 0 point adjustment is carried out in accordance with the above-mentioned procedure (See FIG. 4B-1).

Then, the honeycomb structured body 1, instead of a standard sample S, is placed with one end face of the honeycomb structured body 1 in contact with the reference surface 2 (See FIG. 4B-2).

Here, if a setting value L, which is the length required for the honeycomb structured body 1, is input to the contact measurement apparatus 10, the measurement probe 3 will move only the amount of the absolute value of $(L-L_0)$ in a direction nearing the reference surface 2 (downward vertical direction). At this time, if the actual length of the longitudinal direction of the honeycomb structured body 1 is indeed L, the tip of the contacting probe 3*b* will be in the position distanced L from the reference surface 2 thereby meaning that the contacting probe 3*b* and the end face of the top side of the honeycomb structured body 1 just contact precisely to each other. Thus, the displacement from the position of origin of the contacting probe 3*b* in relation to the rail 3*a* should indicate 0, and it should thereby be confirmable that the actual measurement value of the length is indeed L.

However, because the actual length of the longitudinal direction of the honeycomb structured body 1 is not L but is (L+Z), even if the rail 3*a* is moved the amount of the value $(L-L_0)$ the contacting probe 3*b* will be pushed back the amount of Z (Which means that further movement is not possible). In such a case the displacement of the contacting probe 3*b* from the position of origin of the contacting probe 3*b* in relation to the rail 3*a* should indicate Z (a positive number), and it will therefore be confirmed that the actual length of the longitudinal direction of the honeycomb structured body 1 is the value (L+Z) of Z added to the setting value L (See FIG. 4B-3). In other words, the honeycomb structured body 1 shown in FIGS. 4B-2 and 4B-3 has a longitudinal direction length containing a value (i.e. variation) larger than the length L (Product specifications or the like for instance) required for the honeycomb structured body by an amount Z.

In the method for inspecting a honeycomb structured body according to the embodiments of the present invention it is, for instance, acceptable to input to the contact measurement apparatus a length (L−d) or the like shorter by a prescribed length d than the length L as the setting value, instead of the length L required for the honeycomb structured body, as the length of the longitudinal direction of the honeycomb structured body. Simple description will now be put forth in regard to a case in which measurement of a honeycomb structured body having an actual longitudinal direction length of (L+Z) and a required length of L is carried out using the setting value (L−d).

In the above-mentioned case, the measurement probe 3 moving only the amount of $(L-d-L_0)$, and in correspondence to this the rail 3*a* moves only the amount of $(L-d-L_0)$. At this time, if the length of the longitudinal direction of the honeycomb structured body is L, the contacting probe 3*b* is pushed back (further movement not possible) only the amount of the length d, and because the actual length of the longitudinal direction of the honeycomb structured body is (L+Z), the measurement probe 3 is further pushed back only the amount of the length Z (further movement not possible).

Therefore, from the displacement of the contacting probe 3*b* from the position of origin in relation to the rail 3*a* indicating (d+Z) (a positive number), it is confirmed that the actual length of the longitudinal direction of the honeycomb structured body 1 is the value of (L+Z) which is obtained by adding (d+Z) to the setting value (L−d).

And also in a case in which the actual length of the longitudinal direction of the honeycomb structured body 1 is (L−Z), it may become easier to measure the length of the longitudinal direction of the honeycomb structured body 1 in the same manner as in the above-mentioned measurement procedure. For instance, if the setting value L is input into the contact measurement apparatus 10, the measurement probe 3 moves only the amount of $(L-L_0)$ in a manner nearing the reference surface 2. In the situation after the movement of the measurement probe 3, the contacting probe 3*b* and the end face of the top side of the honeycomb structured body 1 are not yet in contact (at this time the displacement of the contacting probe 3*b* from the position of origin in relation to the rail 3*a* is 0), because the actual length of the longitudinal direction of the honeycomb structured body 1 is (L−Z) with respect to the distance in between the tip of the contacting probe 3*b* and the reference surface 2 being L. From here the contacting probe 3*b* moves (moves along the rail 3*a* only the amount of −Z) only the amount of Z along the rail 3*a* down the vertical direction of the coordinate axis. Herewith, the contacting probe 3*b* and the end face of the top side of the honeycomb structured body 1 come into contact. At this time, from the displacement of the contacting probe 3*b* from the position of origin in relation to the rail 3*a* indicating −Z, it is confirmed that the actual length of the longitudinal direction of the honeycomb structured body 1 is the value (L−Z) had by adding −Z to the setting value L.

In the manner set forth herein above, in the method for inspecting a honeycomb structured body according to the embodiments of the present invention, it may become easier to carry out measurement of the length of the longitudinal direction of the honeycomb structured body 1. The procedure of measurement is not limited to the example set forth hereinabove, as procedures which may attain the same effect more easily also fall within the scope of the present invention.

At this point it is acceptable for the reference surface 2 to be installed in the horizontal direction as is shown in FIG. 4A-1 and the like. It is also acceptable to install the reference surface 2 in the vertical direction, and even in slanted arrangements. In the method for inspecting a honeycomb structured body according to one embodiment of the present invention, because the honeycomb structured body is disposed between the reference surface 2 and the measurement probe 3 in the manner of the standard sample S, and measurement is carried out in a manner sandwiching the honeycomb structured body there between the reference surface 2 and the measurement probe 3, as long as the honeycomb structured body is able to be disposed in a manner securely fixed therein, the reference surface 2 may be installed in any direction. For example, it is acceptable for instance, to carry out measurement of the shape of the honeycomb structured body in the longitudinal direction by installing the reference surface 2 in a vertically oriented direction (which differs from the horizontal direction shown in FIG. 4A-1 and the like), making an end face of the honeycomb structured body contact with the reference surface 2, and moving the measurement probe in a direction perpendicular to the reference surface 2 (i.e. the horizontal direction) and the like.

And the configuration of the rail 3*a* and the contacting probe 3*b* are not limited to the configuration shown in FIG. 4A-1 and the like. For instance, it is acceptable to constitute in a manner of providing a cylindrical-type (can-type) rail 3*a* and a contacting probe 3*b* installed in a manner able to slide through inside of the cylindrical-type (can-type) rail 3*a*, or the like. As long as the rail 3*a* is disposed in a manner perpendicular to the reference surface 2, and the contacting probe 3b is able to move along the rail 3a, it may become easier to fill the role as a constituent element of the measurement probe 3.

Although the shape of the tip of the contacting probe 3b on the side configured to contact with the end face of the honeycomb structured body is not particularly limited, it is preferable that the shape is not one taking on round features, or is sharply edged, but a planar shape attained by cutting the tip of the contacting probe 3b with a plane perpendicular in relation to the length direction of the rail 3a.

In a case in which the shape of the tip of the contacting probe 3b is one taking on round features or is sharply edged, when the portion of the tip of the contacting probe 3b protruding out the farthest comes to contact with the cell wall, no errors will occur in the measured results because the contact position corresponds to the position of the end face of the honeycomb structured body 1. However, in a case in which the portion of the tip of the contacting probe 3b protruding out the farthest does not come into contact with the cell wall, the position of the contacting probe 3b does not correspond to the position of the end face of the honeycomb structured body, but moves further in a direction nearing the reference surface, which brings about the concern that error will occur in the measured results. Because of the shape of the tip of the contacting probe 3b being a planar shape having a face perpendicular to the rail 3a, there is no concern of errors as above, and it may become easier to carry out accurate measurement of the shape of the honeycomb structured body in the longitudinal direction.

In a case in which the shape of the tip of the contacting probe 3b is the above-mentioned planar shape, the shape of the face is not particularly limited, and examples of the shape of the face include, for instance, arbitrary shapes such as a circular shape, oval shape, a square shape, a rectangular shape, a hexagonal shape. And the size of the same face is acceptable as long as it is at least larger than the size of the cells therein.

During measuring, the movement speed of the measurement probe 3 upon moving the measurement probe 3 in a direction nearing the reference surface 2 is not particularly limited, and it is acceptable to be at least about 5 cm/s and at most about 50 cm/s.

If the movement speed of the measurement probe 3 is in the above-mentioned range, it may become easier to carry out highly efficient measurement of the length of the longitudinal direction of the honeycomb structured body while tending not to incur damage and the like to the cell walls upon contact of the contacting probe 3b and the honeycomb structured body.

The position at which the contacting probe 3b makes contact with the end face of the honeycomb structured body is not particularly limited, and can be for instance any position on the end face, such as the end face of the honeycomb fired body, the sealing material layer (the adhesive layer), the sealing material layer (the coat layer), and the like. As long as the object of inspection is an item concerning the shape of the honeycomb structured body in the longitudinal direction, it is acceptable to carry out adjustment of the contact position of the end face and the contacting probe 3b in correspondence to the shape that is the object of inspection. Normally, the position at which the contacting probe 3b makes contact is the end face of the honeycomb fired body.

As described herein above, whether the aggregated honeycomb structured body or the integral honeycomb structured body, it may become possible in the method for inspecting a honeycomb structured body according to the embodiments of the present invention, to suitably make both the aggregated honeycomb structured body and the integral honeycomb structured body as the object of inspection. Out of the two, it is particularly preferable that the honeycomb structured body of a plurality of honeycomb fired bodies bonded together by interposing an adhesive layer (i.e. the aggregated honeycomb structured body) be the object of inspection.

In a case in which the object of inspection is the aggregated honeycomb structured body, there are many cases in which the shape of the aggregated honeycomb structured body in the longitudinal direction is more complicated in comparison to the integral honeycomb structured body, and this is caused by the aggregated honeycomb structured body comprising a plurality of honeycomb fired bodies. For instance, if there is some variation among the lengths in the longitudinal direction of the honeycomb fired bodies (which are constituent elements of the honeycomb structured body) and a plurality of these honeycomb fired bodies are bonded together thereby generating variations at the position at which they are bonded together along the longitudinal direction, surface unevenness will occur more easily at the end face of the aggregated honeycomb structured body due to the above-mentioned variation as in the manner of a honeycomb structured body 11 shown in FIGS. 4C-2 and 4C-3.

In order to inspect the shape of a honeycomb structured body having a shape in the manner described above, it was necessary, in conventional methods for inspecting, to carry out complicated tasks and treatments thereto. However, in the method for inspecting a honeycomb structured body according to the embodiments of the present invention, measurement of the shape in the longitudinal direction of the above-mentioned honeycomb structured body having surface unevenness tends to be carried out more easily and accurately, by just moving the measurement probe relatively in a direction nearing the reference surface. Therefore, it may become easier to suitably make even an aggregated honeycomb structured body having a complicated end face structure as the object of inspection.

In order to carry out measurement of the shape of the aggregated honeycomb structured body in the longitudinal direction, it is possible to do so by repeatedly carrying out measuring by contacting the contacting probe with each region in which a single honeycomb fired body occupies in the entire end face of the honeycomb structured body. Moreover, in order to move the measurement probe 3 and/or the honeycomb structured body 1 from one measurement point to another measurement point, it is acceptable to further combine well known movement means that are able to move the object in the horizontal direction, such as an x-y stage and a multi axis stage.

It is preferable that the inspection item concerning the shape of the honeycomb structured body in the longitudinal direction be at least one of: the length in the longitudinal direction, the degree of parallelism, and the degree of position.

In the method for inspecting a honeycomb structured body according to the embodiments of the present invention, although the inspection item concerning the shape in the longitudinal direction is not particularly limited, it may become easier to accurately and in a short period of time carry out measurement even if the inspection item is the above-mentioned inspection item concerning the shape in the longitudinal direction.

The reason for this, as has been set forth in the description of the fact that the aggregated honeycomb structured body is desirable as the object for inspection, is that in conventional methods for inspecting, it has been a difficulty to carry out measurement of the shape in the longitudinal direction (including the length of the longitudinal direction as well) due to the presence of surface unevenness on the end face of the aggregated honeycomb structured body. However, with the method for inspecting a honeycomb structured body according to the embodiments of the present invention, it may become easier to suitably carry out inspection thereof.

At this point, the term 'the length in the longitudinal direction' refers to the value of each longitudinal direction length measured for each region occupied by the end face of a single honeycomb fired body out of the entire end face of a honeycomb structured body.

The degree of parallelism and the degree of position are based on JIS B 0621. More specifically, the term 'the degree of parallelism' refers to the space interval in between two parallel flat surfaces at the time when all end faces of each honeycomb fired body on the side at which the contacting probe makes contact lay in between the two flat surfaces parallel to the reference surface. And the term 'the degree of position' refers to the space interval in between the parallel two flat surfaces at a time when a 'reference flat surface' that is parallel to the reference surface is set to a position distanced by prescribed amount (for instance, the mean values and the like of a set of the longitudinal direction lengths when the longitudinal direction length has been measured a plurality of times) from the reference surface, and when all end faces of each honeycomb fired body on the side at which the contacting probe makes contact lay in between the two parallel flat surfaces that are symmetrical in relation to this reference flat surface.

The contents of JIS B 0621 are incorporated herein by reference in its entirety.

In the definition of the above-mentioned inspection items, both are assumed to apply to the aggregated honeycomb structured body, however it may also be possible to apply them to the integral honeycomb structured body as well. More specifically, in the above definition, in a case in which there is one end face of a honeycomb fired body, it is acceptable to carry out single point or multipoint measurement to that end face in the measurement of the above-mentioned inspection items.

It may also be possible to make items such as the difference between the standard length (the design value) and the actual measured value on each honeycomb fired body constituting an aggregated honeycomb structured body the inspection items concerning the shape in the above-mentioned longitudinal direction.

In the method for inspecting a honeycomb structured body according to the embodiments of the present invention, although the shape of the honeycomb structured body in the longitudinal direction is the object of inspection, the direction perpendicular to the longitudinal direction accessorily in addition to the measurement of the longitudinal direction may be measured by combining a plurality of contact measurement apparatuses.

In the method for inspecting a honeycomb structured body according to the embodiments of the present invention, it is desirable that the contact measurement apparatus include a plurality of measurement probes.

If the contact measurement apparatus includes a plurality of measurement probes, it may become easier to reduce the number of measurements in a case that there are a plurality of measurement points on the end face of a honeycomb structured body and thereby reduce the occurrence of measurement error that may occur by carrying out measurement multiple times. And also, if the contact measurement apparatus includes the same number of measurement probes as the number of measurement points, it may become easier to carry out measurement of the shape of the honeycomb structured body in the longitudinal direction in just one measurement. And thereby, it may become easier to shorten the amount of time required upon inspecting and improve the accuracy of the measurement.

Next, using FIGS. 4C-1, 4C-2 and 4C-3, and FIGS. 5A and 5B as references, description will be put forth in regard to an embodiment of the present invention in which a contact measurement apparatus includes a plurality of measurement probes.

Figure 5A:
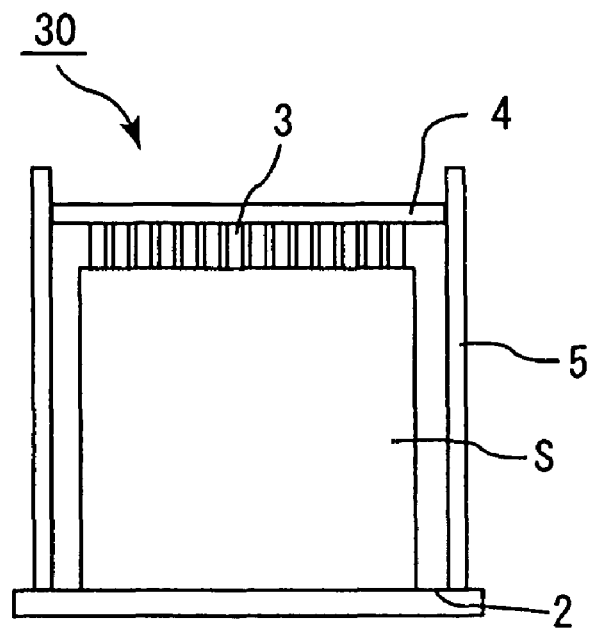
FIG. 5A is a front view schematically showing a process of a concrete example of one embodiment of the present invention using a contact measurement apparatus that includes a plurality of measurement probes.
Figure 5B:
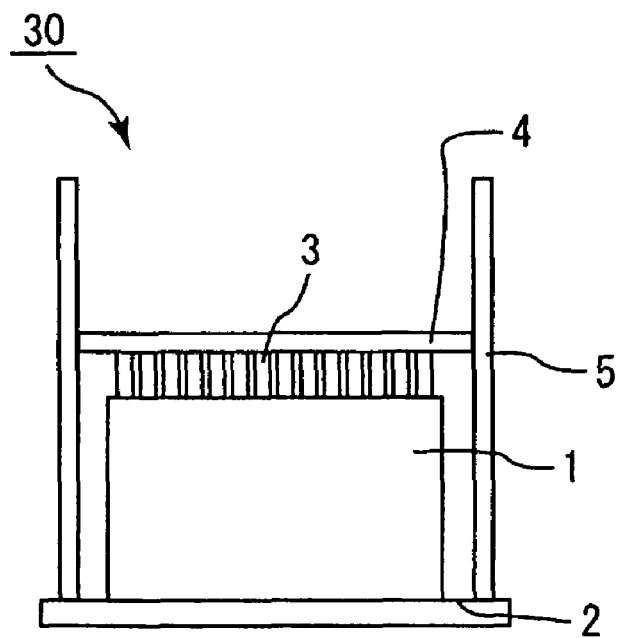
FIG. 5B is a front view schematically showing another process of a concrete example of one embodiment of the present invention using a contact measurement apparatus that includes a plurality of measurement probes.

FIG. 5A is a front view schematically showing a process of a concrete example of embodiment of the present invention using a contact measurement apparatus that includes a plurality of measurement probes. FIG. 5B is a front view schematically showing another process of a concrete example of embodiment of the present invention using a contact measurement apparatus that includes a plurality of measurement probes.

A contact measurement apparatus 20 shown in FIGS. 4C-1, 4C-2, and 4C-3 includes the reference surface 2 and two measurement probes 31 and 32. The measurement probe 31 includes a rail 31a and a contacting probe 31b and the measurement probe 32 includes a rail 32a and a contacting probe 32b.

Also, the reference surface 2 and one end face of the honeycomb structured body 11 contact to each other, and the contacting probes 31b and 32b contact with the other end face of the honeycomb structured body 11. Moreover, the honeycomb structured body 11 shown in FIGS. 4C-2 and 4C-3 is an aggregated honeycomb structured body.

A method for measuring the longitudinal length of this kind of aggregated honeycomb structured body 11 is described with reference to FIGS. 4C-1, 4C-2, and 4C-3.

Figures 3, 4C:
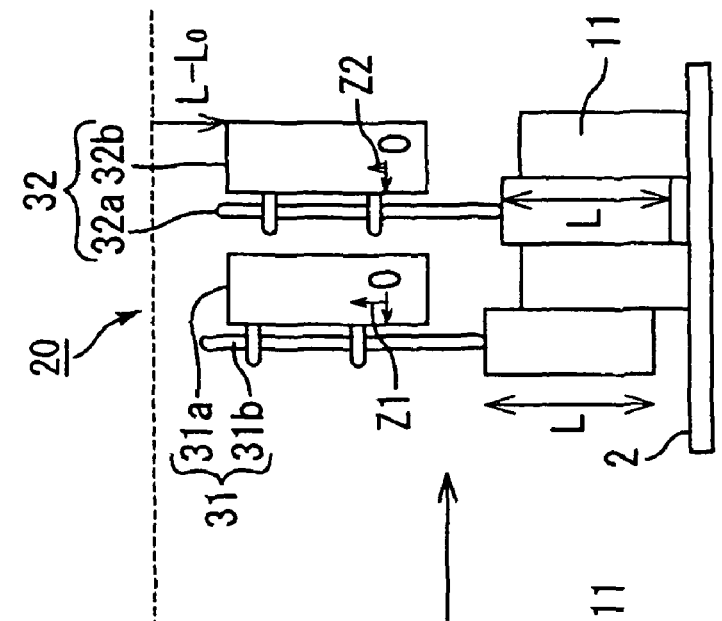
Figures 2, 4C:
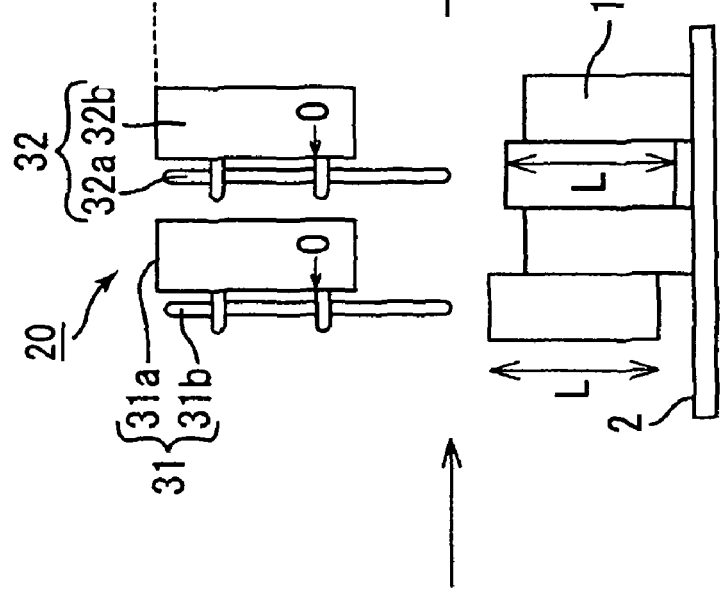
Figures 1, 4C:
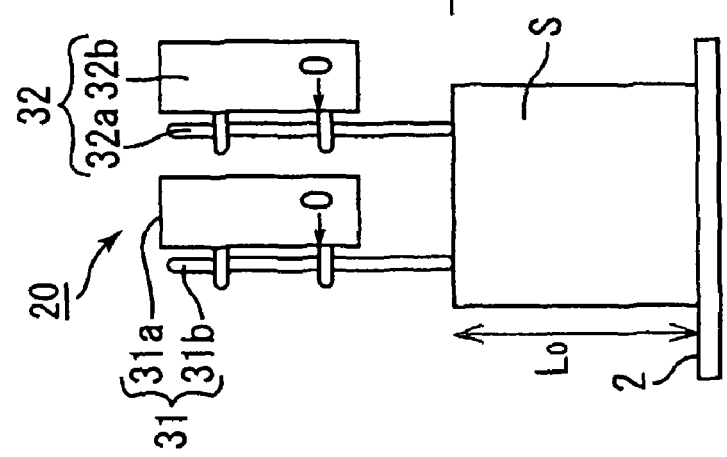

First, a 0 point adjustment is carried out in accordance with the above-mentioned procedure (See FIG. 4C-1).

Then, the honeycomb structured body 11, instead of a standard sample S, is placed with one end face of the honeycomb structured body 11 in contact with the reference surface 2 (See FIG. 4C-2).

FIG. 4C-3 shows a state of after having measured the shape ('the length' in the drawing) of the honeycomb structured body 11 in the longitudinal direction, and in the measurement probe 31 a displacement from the position of origin of the contacting probe 31b in relation to the rail 31a indicates $Z_1$, and in the measurement probe 32 a displacement from the position of origin of the contacting probe 32b in relation to the rail 32a indicates $Z_2$. Therefore, the length of the honeycomb structured body in the longitudinal direction as measured by the measurement probe 31 and the measurement probe 32 is $(L+Z_1)$, and $(L+Z_2)$ respectively.

In the honeycomb structured body 11 shown in FIGS. 4C-2 and 4C-3 there is variation in the vertical position at which the honeycomb fired bodies are bonded together in some of a plurality of honeycomb fired bodies therein (in other words, they vary only the amount of $Z_1$ and $Z_2$ in the upward vertical direction of the coordinate axis in relation to reference surface 2). Because this sort of variation exists, when measurement of the length of the honeycomb structured body 11 in the longitudinal direction is carried out by the contact measurement apparatus 20, measurement results of $(L+Z_1)$, and $(L+Z_2)$ respectively, are indicated in each the measurement probe 31 and the measurement probe 32 (See FIG. 4C-3).

In this manner, by means of the contact measurement apparatus including a plurality of measurement probes, it may become easier to carry out a multipoint measurement to the end face of a honeycomb structured body and thereby conduct inspection of various inspection items in just a single measurement.

Next, using FIGS. 5A and 5B as references, description will be put forth in regard to an embodiment in which measurement is carried out regarding the shape of a honeycomb structured body in the longitudinal direction using a contact measurement apparatus that is configured in a manner enabling it to contact a measurement probe to each region occupied by an end face of a single honeycomb fired body, in the end face of a honeycomb structured body.

A contact measurement apparatus 30 shown in FIG. 5A includes a reference surface 2, two support members 5 installed perpendicular in relation to the reference surface 2, a measurement probe support plate 4 suspended in a manner parallel to the reference surface 2 and in between two of the support members 5, and a plurality of the measurement probe 3 supported by the measurement probe support plate 4. The above-mentioned measurement probe support plate 4 is configured in a manner able to ascend and descend along the support member 5 (e.g. a ball screw or the like) while maintaining parallelism with the reference surface. And, a plurality of the measurement probes 3 are installed in a manner as to penetrate through the measurement probe support plate 4.

Other than the above-mentioned members, the standard sample S used for the 0 point adjustment of the contact measurement apparatus 30 is installed to the contact measurement apparatus 30 shown in FIG. 5A. Therefore the contact measurement apparatus 30 shown in FIG. 5A is in the state of carrying out the 0 point adjustment.

In order to carry out measurement of the shape of the honeycomb structured body in the longitudinal direction, after the 0 point adjustment of the contact measurement apparatus 30, first one end face of the honeycomb structured body 1 (which is the object of inspection) is brought into contact with the reference surface 2. Next, the support member 5 (which is a ball screw or the like) is rotated or the like, thus moving (lowering) the measurement probe support plate 4 in a direction nearing the reference surface 2. By the lowering of this measurement probe support plate 4, the plurality of the measurement probes 3 also move in a direction nearing the reference surface 2. And, as shown in FIG. 5B, the measurement probe support plate 4 is lowered until all of the contacting probes contact with the other end face of the honeycomb structured body, to thereby complete the measurement.

If the contact measurement apparatus 30 of the embodiment shown in FIG. 5B is used, the measurement probe 3 contacts with each region occupied by an end face of a single honeycomb fired body on the end face of a honeycomb structured body, and because of this it may become easier to attain the required data for each inspection item in just a single measurement, which thereby makes it easier to carry out inspection of the shape of a honeycomb structured body in the longitudinal direction accurately and in a short period of time.

In a conventional method (for example, JP-A2002-267427), the shape of the honeycomb structured body is inspected by seeking changes in the luminance (in the image to which image processing has been carried out) that correspond to changes in the shape thereof. In order to seek changes in the above-mentioned luminance, it is necessary to carry out image conversion processing and the like for each single pixel corresponding to the original photographed image. And if the measurement conditions such as the lighting conditions or shaking movement and the like change to even a slight degree, a large error was in some cases generated in the measurement results. In order to suppress this measurement error to a minimum it is necessary to strictly set the measurement conditions, and this method required much cost and time. And only the shape in the radial direction of the end face was intended for measurement, as the shape of the longitudinal direction of the honeycomb structured body was not intended for measurement.

In accordance with the method for inspecting a honeycomb structured body according to the embodiments of the present invention, since the only requirement for measuring the shape of the honeycomb structured body is to contact a contacting probe constituting the measurement probe with an end face of the honeycomb structured body, measurement conditions have little influence on the measurement results, and therefore measurement errors may be reduced more easily. Moreover, because evaluation of the shape of the honeycomb structured body along the longitudinal direction tends to be carried out more accurately and easily in a short period of time, it may become easier to shorten the amount of time required in inspection of a honeycomb structured body. Hereby, it may become easier to accurately and in a short period of time determine which honeycomb structured bodies are in compliance with a product specification.

And, in the method for inspecting a honeycomb structured body according to the embodiments of the present invention, it may become easier to seek various inspection items by carrying out multipoint measurement of the shape of a honeycomb structured body in the longitudinal direction. And a multifaceted evaluation may be carried out more easily as an evaluation of the product specification of a honeycomb structured body.

In addition to the above-mentioned effect, in a contact measuring apparatus including a plurality of measurement probes, because it may become easier to carry out a multipoint measurement of the shape of a honeycomb structured body in the longitudinal direction in a single measurement run, it may therefore become easier to even further shorten the amount of time needed in inspection.

Next, the method for manufacturing a honeycomb structured body according to the embodiments of the present invention is described.

The method for manufacturing a honeycomb structured body according to the embodiments of the present invention is a method for manufacturing a honeycomb structured body, comprising: molding ceramic raw materials to manufacture a pillar-shaped honeycomb molded body having a multitude of cells placed in parallel in the longitudinal direction with a cell wall therebetween; firing the honeycomb molded body to manufacture a honeycomb structured body comprising a honeycomb fired body; and inspecting the shape of the honeycomb structured body, wherein the inspection of the shape of the honeycomb structured body comprises measuring the shape of the honeycomb structured body in the longitudinal direction through: preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body.

Herein below description of the method for manufacturing a honeycomb structured body according to the embodiments of the present invention will be put forth.

At this point, using as an example a case of manufacturing a honeycomb structured body according to the embodiments having silicon carbide as a main component, description will be put forth in regard to the method for manufacturing a honeycomb structured body of the present invention in a case using silicon carbide powder (which is ceramic raw material).

Of course, the main component of the constitution material of the honeycomb structured body is not limited to silicon carbide. Other examples of ceramic raw material include for instance, nitride ceramics such as aluminum nitride, silicon nitride, boron nitride, titanium nitride; carbide ceramics such as zirconium carbide, titanium carbide, tantalum carbide, tungsten carbide; and oxide ceramics such as alumina, zirconia, cordierite, mullite, and aluminum titanate.

Out of the above-mentioned possible components, non-oxide ceramics are desirable for use as the main component of the constituting material of the honeycomb structured body, with silicon carbide being particularly desirable. This is because they are excellent in thermal resistance properties, mechanical strength, and thermal conductivity. Moreover, silicon-containing ceramic, which is obtained by infusing metallic silicon with the ceramics set forth above, as well as ceramic bound by silicon or silicate compounds can also be used as the constituting material of the honeycomb structured body. And out of these, those (silicon-containing silicon carbide) of silicon carbide infused with metallic silicon are preferable.

Firstly, silicon carbide powder differing in mean particle diameters as a ceramic raw material, and organic binder are dry mixed to prepare a powder mixture. In step with this, a liquid mixture is prepared by mixing a liquid plasticizer, a lubricant, and water, and then using a wet mixing apparatus the above-mentioned liquid mixture and the powder mixture are mixed together, thereby preparing a wet mixture for use in the manufacture of a molded body.

The particle diameter of the above-mentioned silicon carbide powder is not particularly limited, and preferably is less susceptible to shrinkage in succeeding firing. A powder having a combination of 100 parts by weight of powder having a mean particle diameter of at least about 0.3 μm and at most about 50 μm, and about 5 parts by weight and at most about 65 parts by weight of powder having a mean particle diameter of at least about 0.1 μm and at most about 1.0 μm is preferable.

In order to adjust the diameter and the like of the pores of the honeycomb fired body, it is necessary to adjust the firing temperature. However it may become easier to adjust the diameter of the pores by adjusting the particle diameter of the inorganic powder.

The above-mentioned organic binder is not particularly limited. Examples of the above-mentioned binder include methyl cellulose, carboxymethyl cellulose, hydroxyethyl cellulose, polyethylene glycol, and the like for instance. Out of the above, methyl cellulose is preferable.

It is preferable that the blending amount of the above-mentioned binder be normally at least about 1 part by weight and at most about 10 parts by weight with respect to 100 parts by weight of inorganic powder.

The above-mentioned plasticizer is not particularly limited. For instance, an example of the plasticizer includes glycerin and the like.

Also, the above-mentioned lubricant is also not particularly limited. For instance, examples of the above-mentioned lubricant include polyoxyalkylene series compounds such as polyoxyethylene alkyl ether, polyoxypropylene alkyl ether.

Concrete examples of the lubricant include, for instance, polyoxyethylene monobutyl ether, polyoxypropylene monobutyl ether, and the like.

Moreover, depending upon the case in question, it is be acceptable for the above-mentioned liquid mixture not to contain plasticizer or lubricant.

And when preparing the above-mentioned wet mixture, it is acceptable to use a liquid dispersal medium. Examples of the above-mentioned liquid dispersal medium include water, organic solvents such as benzene, or alcohols such as methanol.

Moreover, it is acceptable to add a molding aid to the above-mentioned wet mixture.

The above-mentioned molding aid is not limited in particularly. For instance, examples of the above-mentioned molding aid include ethylene glycol, dextrin, fatty acid, fatty acid soap, polyalcohol, and the like.

Moreover, according to need it is acceptable to add a pore-forming agent such as balloon (which are micro-sized hollow spherical bodies composed of oxide ceramic), spherical acrylic particle, graphite, and the like to the above-mentioned wet mixture.

The above-mentioned balloon is not particularly limited. For instance, examples of the above-mentioned balloon include alumina balloon, glass micro balloon, shirasu balloon, fly ash balloon (FA balloon), mullite balloon, and the like. Out of these, alumina balloon is preferable for use.

The wet mixture using the silicon carbide powder prepared here is preferably at a temperature of about 28 Degrees Celsius or less. This is because a temperature that is not excessively high will more easily prevent the organic binder from undergoing gelation.

Also it is preferable that the proportion of the organic component within the above-mentioned wet mixture is of about 10% weight or less, and it is preferable that the moisture content be at least about 8.0% by weight and at most about 20% by weight.

After being prepared, the above-mentioned wet mixture is transported to the extraction molding machine.

After charging the transported wet mixture to the extrusion molding machine, it undergoes extraction molding to become the honeycomb molded body of a desired shape.

Next, the honeycomb molded body is dried using a microwave drying apparatus, a hot air drying apparatus, a dielectric drying apparatus, a reduced pressure drying apparatus, a vacuum drying apparatus, a freeze drying apparatus, or the like, resulting a dried honeycomb molded body.

At this point, using a cutting apparatus, a cutting is carried out to cut both ends of the manufactured honeycomb molded body to cut the honeycomb molded body to a prescribed length.

Then, according to need, a prescribed amount of plug material paste which will serve as plugs is injected into the end portion of the outlet side of the group of inlet cells, as well as the end portion of the inlet side of the group of outlet cells, thereby plugging the cells. Upon carrying out plugging of these cells, a plugging mask is aligned to an end face of the honeycomb molded body (i.e. the cut end face of after the cutting) and the plug material paste is injected only into the cells requiring plugging.

Although above-mentioned plug material paste is not particularly limited, such plug material paste as to set the porosity of a plug manufactured through the subsequent processes to at least about 30% and at most about 75% is desirable, and it is for instance, possible to use a substance identical to the above-mentioned wet mixture as the plug material paste.

It is acceptable to carry out the injecting of the above-mentioned plug material paste according to necessity, and in a case of injecting the above-mentioned plug material paste, it is, for instance, possible to suitably use the honeycomb structured body attained through the subsequent processes as a ceramic filter, and in a case of not injecting the above-mentioned plug material paste, it is possible to suitably use the honeycomb structured body attained through the subsequent processes as a catalyst supporting carrier.

Next, by degreasing (for example, at a temperature of at least about 200 Degrees Celsius and at most about 500 Degrees Celsius) and firing of (for example, at a temperature of at least about 1400 Degrees Celsius and at most about 2300 Degrees Celsius) the honeycomb molded body plugged with the above-mentioned plug material paste under prescribed conditions, it is possible to manufacture a honeycomb fired body (see FIG. 2A) wherein the entire body of which is constituted from a single fired body, and a multitude of the above-mentioned cells placed in parallel with one another in the longitudinal direction with a cell wall therebetween and partitioned by cell walls, wherein either side of the above-mentioned cells is plugged.

The conditions of degreasing and firing of the above-mentioned honeycomb molded body can be the same conditions that have been used conventionally when manufacturing a filter comprised of porous ceramic.

It may also become easier to inspect the shape of the degreased honeycomb molded body by the method for inspecting according to the present invention.

Then, a sealing material paste layer is formed by evenly coating the side surfaces of the honeycomb fired body with a sealing material paste, which becomes the sealing material layer (the adhesive layer). After this, another honeycomb fired body is piled up on the above-mentioned honeycomb fired body, which has been coated with the sealing material paste layer. By carrying out the above process repeatedly, an aggregated body of honeycomb fired body of prescribed size is produced.

An example of the above-mentioned sealing material paste may include a substance containing inorganic fiber and/or inorganic particulate in addition to inorganic binder, organic binder, for example.

Examples of the above-mentioned inorganic binder include silica sol, alumina sol, and the like. Also, it is acceptable to use the above singly, or use a combination of two or more of them in parallel. Of the above-mentioned inorganic binders, silica sol is preferable for use.

Examples of the above-mentioned organic binder include polyvinyl alcohol, methyl cellulose, ethyl cellulose, carboxymethyl cellulose, and the like, for example. Also, it is acceptable to use the above singly, or use a combination of two or more of them in parallel. Of the above-mentioned organic binders, carboxymethyl cellulose is preferable for use.

Examples of the above-mentioned inorganic fiber include ceramic fibers such as silica-alumina, mullite, alumina, silica and the like, for example. Also, it is acceptable to use the above singly, or use a combination of two or more of them in parallel. Of the above-mentioned inorganic fiber, alumina fiber is preferable for use.

Examples of the above-mentioned inorganic particulate include carbide, nitride, and the like, for example. More specific examples of the above-mentioned inorganic particulate include inorganic powder and the like comprised of silicon carbide, silicon nitride, boron nitride, or the like, for example. It is acceptable to use the above singly, or use a combination of two or more of them in parallel. Of the above-mentioned inorganic particulate, silicon carbide, which excels in its thermal conductivity properties, is preferable for use.

And furthermore, it is also acceptable, according to need, to add a pore-forming agent such as balloon which is a micro sized hollow sphere having oxidant family ceramic as a component therein, spherical acrylic particle, or graphite and the like, to the above-mentioned sealing material paste.

The above-mentioned balloon is not particularly limited, as alumina balloons, glass micro balloon, shirasu balloon, fly ash balloon (FA balloon), mullite balloon, for example, are all acceptable for use. Of the above-mentioned, alumina balloon is the preferable for use.

Next, the aggregated body of the honeycomb fired body is heated to dry and solidify the sealing material paste layer, then forming the sealing material layer (the adhesive layer).

Next, using a diamond cutter and the like, a cutting is carried out on the aggregated body of the honeycomb fired body, which comprises a plurality of honeycomb fired bodies adhered together by interposing the sealing material layer (the adhesive layer), thereby manufacturing a cylindrical ceramic block.

Afterward, a sealing material layer (a coat layer) is formed by coating the above-mentioned sealing material paste to the outer periphery of the ceramic block. Thereby, it is possible to manufacture a honeycomb structured body having the sealing material layer (the coat layer) disposed on the outer peripheral portion of a cylindrical ceramic block comprising a plurality of honeycomb fired bodies adhered together by interposing the sealing material layer (the adhesive layer).

In the method for manufacturing a honeycomb structured body according to the embodiments of the present invention, an inspecting of the shape is carried out regarding the shape of the honeycomb structured body manufactured in the manner set forth herein above.

In the above-mentioned inspecting of the shape, the inspecting of the shape is carried out by measuring the shape of the honeycomb structured body in the longitudinal direction, the measuring comprising preparing a contact measurement apparatus including a reference surface, a rail disposed perpendicularly to the reference surface, and a measurement probe including a contacting probe configured to move along the rail; contacting one end face of the honeycomb structured body with the reference surface; and moving the measurement probe in a direction nearing the reference surface to contact the contacting probe with the other end face of the honeycomb structured body. It is possible to suitably employ the method for inspecting a honeycomb structured body of the present invention already set forth herein above as the method for inspecting carried out in the present inspecting of the shape.

In the method for manufacturing a honeycomb structured body according to the embodiments of the present invention, it is preferable that the honeycomb structured body which is the object of inspection is one comprising a plurality of honeycomb fired bodies bonded together by interposing an adhesive layer (the aggregated honeycomb structured body).

The reason for this is that a honeycomb structured body manufactured through the method for manufacturing according to the embodiments of the present invention is normally used while housed within the casing. When housing the manufactured honeycomb structured body inside of the casing, if the shape of the honeycomb structured body in the longitudinal direction in particular is not in order, it may become more difficult for the honeycomb structured body to be housed inside of the casing in some cases or damage may be sometimes generated. Although the inspecting of the shape is carried out for the purpose of preventing these kinds of problems from occurring, measurement of the shape in the longitudinal direction tends to be conducted more accurately and easily even to the aggregated honeycomb structured body, which has a complicated shape in the longitudinal direction as when compared to the integral honeycomb structured body, and thereby it may become easier to suitably make the aggregated honeycomb structured body the object of inspection.

Also, it is preferable that the inspection item concerning the shape of the honeycomb structured body in the longitudinal direction be at least one of the length in the longitudinal direction, or the degree of parallelism and the degree of position. Moreover, it is preferable that the contact measurement apparatus includes a plurality of measurement probes.

As to the reason for these arrangements being desirable, in addition to the reasons described in the explanation of the method for inspecting a honeycomb structured body according to the embodiments of the present invention, they are desirable because the shape of the honeycomb structured body in the longitudinal direction as a final product may be evaluated more easily in a multifaceted manner to ensure the functionality and safety thereof.

In this manner, it may become easier to discriminate between defective and satisfactory product by carrying out inspection of the shape of the honeycomb structured body in the longitudinal direction in the present inspecting of the shape, and thereby it may become easier to manufacture a honeycomb structured body having a desired shape.

Afterward, according to necessity, a catalyst is supported on the honeycomb structured body. It is also acceptable to conduct the supporting of the above-mentioned catalyst on the honeycomb fired body of before the manufacture of the aggregated body.

In a case of supporting a catalyst, it is preferable to form an alumina film of a high specific surface area onto the surface of the honeycomb structured body, and to apply a helper catalyst and a catalyst of platinum or the like on the surface of this alumina film.

Examples of methods of forming an alumina film onto the surface of the above-mentioned honeycomb structured body include for instance, a method of impregnating the honeycomb structured body with a metallized compound solution of containing aluminum such as $Al(NO_3)_3$ and then heating, a method of impregnating the honeycomb structured body with a solution containing alumina powder and then heating and the like.

An example of a method of applying a helper catalyst to the above-mentioned alumina film includes for instance methods and the like impregnating the honeycomb structured body with a metallized compound solution containing rare earth elements such as $Ce(NO_3)_3$ and then heating and the like.

An example of a method of applying a catalyst to the above-mentioned alumina film includes for instance methods and the like of impregnating the honeycomb structured body with a dinitrodiammineplatinum nitric acid solution ($[Pt(NH_3)_2(NO_2)_2]HNO_3$, Platinum content about 4.53% by weight) and then heating and the like.

It is also acceptable to apply a catalyst through a method of first applying a catalyst to alumina particles in advance, then impregnating the honeycomb structured body with a solution containing alumina powder that has been applied with the catalyst, and then heating.

And although the honeycomb structured body manufactured by the method for manufacturing a honeycomb structured body according to the embodiments described up to this point has been an aggregated honeycomb structured body having a structure of a plurality of honeycomb fired bodies bonded together by interposing a sealing material layer (adhesive layer), it is also acceptable that the honeycomb structured body manufactured through the method for manufacturing according to the embodiments of the present invention be a integral honeycomb structured body of a cylindrical ceramic block comprising a single honeycomb fired body. It is preferable that the main constituent material of the integral honeycomb structured body here be cordierite or aluminum titanate.

In a case of manufacturing this kind of integral honeycomb structured body, first, aside from the size of the honeycomb molded body formed by extraction molding being larger compared with a case of manufacturing the aggregated honeycomb structured body, the honeycomb molded body is manufactured using a method identical to that of a case of manufacturing the aggregated honeycomb structured body.

Next, in the same manner as in the method for manufacturing an aggregated honeycomb structured body, using a drying apparatus such as a microwave drying apparatus, a hot air drying apparatus, a dielectric drying apparatus, a reduced pressure drying apparatus, a vacuum drying apparatus, and a freeze drying apparatus, the above-mentioned honeycomb molded body is dried out.

Next, the cutting is carried out on both of the end portions of the dried honeycomb molded body.

Next, a prescribed amount of plug material paste which will serve as plugs is injected into the end portion of the outlet side of the group of inlet cells, as well as the end portion of the inlet side of the group of outlet cells, thereby plugging the cells.

Afterward, in the same manner as in the manufacture of the aggregated honeycomb structured body, degreasing and firing are executed, thereby manufacturing a ceramic block. And as needed, a sealing material layer (the coat layer) is formed, thereby finishing production of the integral honeycomb structured body. It is also acceptable to support a catalyst on the above-mentioned integral honeycomb structured body as well, as is the method described herein above.

With the method for manufacturing a honeycomb structured body according to the embodiments of the present invention described herein above, it may become easier to manufacture a honeycomb structured body with high operational efficiency.

Also, in a case of manufacturing a honeycomb structured body by the above-mentioned method, the shape of the honeycomb structured body in the longitudinal direction may be more easily measured accurately and in a short period of time. Also, because it may become easier to accurately and in a short period of time conduct determination as to whether or not the manufactured honeycomb structured body is in compliance with product specifications, it may become easier to improve the efficiency of all of the processes for manufacturing a honeycomb structured body.

The description has been made about the method for inspecting a honeycomb structured body comprising a honeycomb fired body; however, in a dried honeycomb molded body, a degreased honeycomb molded body and the like that are yet to be fired, it may become easier to obtain the same effects as those of the method for inspecting according to the present invention.

EXAMPLES

Herein below examples will be set forth describing the present invention in further detail. It should, however, be understood that the present invention is not to be limited to only these examples.

In the inspecting of the shape of the method for manufacturing a honeycomb structured body of the present invention, measurement of the shape of a manufactured aggregated honeycomb structured body in the longitudinal direction was conducted employing the method for inspecting a honeycomb structured body of the present invention. The inspection items in the present inspecting of the shape are the length in the longitudinal direction, the degree of parallelism and the degree of position. Evaluation was carried out for each of these items.

Example 1

250 kg of silicon carbide powder having a mean particle diameter of 10 μm, 100 kg of α-type silicon carbide powder having a mean particle diameter of 0.5 μm, and 20 kg of organic binder (methyl cellulose) were blended together to prepare a powder mixture.

Next, 12 kg of lubricant (UNILUBE, Manufactured by NOF Corp.), 5 kg of plasticizer (glycerin), and 65 kg of water were blended to prepare a liquid mixture separately. Next, using a wet mixer machine, the powder mixture and the liquid mixture were blended together, thereby preparing the wet mixture.

And the moisture content of the above prepared wet mixture was 14% by weight.

Next, using a conveyer machine, the wet mixture was conveyed to the extrusion molding machine, and was then charged into the raw material inlet opening.

Moreover, the moisture content of the wet mixture immediately before charging into the extrusion molding machine was 13.5% by weight.

Next, by extrusion molding, a molded body having a shape identical to that shown in FIG. 2A, aside from the ends of the cells not being plugged, was manufactured.

Next, after drying out the above-mentioned raw molded body using a microwave drying apparatus or the like, a plug material paste having a composition identical to that of the above-mentioned wet mixture was injected into prescribed cells.

Then, after drying again using a drying apparatus, degreasing was carried out at 400 Degrees Celsius, and firing was carried out for three hours at atmospheric pressure in an argon atmosphere at 2200 Degrees Celsius, thereby manufacturing a honeycomb fired body comprising a silicon carbide sintered body having a porosity of 40%, a mean pore diameter of 12.5 μm, a size of 34.3 mm×34.3 mm×254 mm, with the number of cells (cell density) of 46.5 pcs/cm$^2$, and a cell wall thickness of 0.20 mm.

A cylindrical ceramic block with a sealing material layer (the adhesive layer) of a thickness of 1 mm was manufactured by adhering a multitude of honeycomb fired bodies together using a heat resistant sealing material paste containing 30% by weight of alumina fiber having a mean fiber length of 20 μm, 21% by weight of silicon carbide powder having a mean particle diameter of 0.6 μm, 15% by weight of silica sol, 5.6% by weight of carboxymethyl cellulose, and 28.4% by weight of water, and then drying at a temperature of 120 Degrees Celsius and cutting using a diamond cutter.

Next, a sealing material paste was prepared by mixing and kneading together 23.3% by weight of silica alumina fiber (mean fiber length 100 μm, mean fiber diameter 10 μm) as inorganic fiber, 30.2% by weight of silicon carbide powder having a mean particle diameter of 0.3 μm as inorganic particle, 7% by weight of silica sol ($SiO_2$ content within the sol: 30% by weight) as inorganic binder, 0.5% by weight of carboxymethyl cellulose as organic binder and 39% by weight of water.

Next, using the above-mentioned sealing material paste, a sealing material paste layer of a thickness of 0.2 mm was formed onto the outer periphery of the honeycomb block. This sealing material paste layer was then dried at a temperature of 120 Degrees Celsius to manufacture a cylindrical honeycomb structured body of 143.8 mm diameter×254 mm length having the sealing material layer (the coat layer) formed on the outer periphery thereof.

(Measurement of the Shape of the Honeycomb Structured Body in the Longitudinal Direction)

Figure 6:
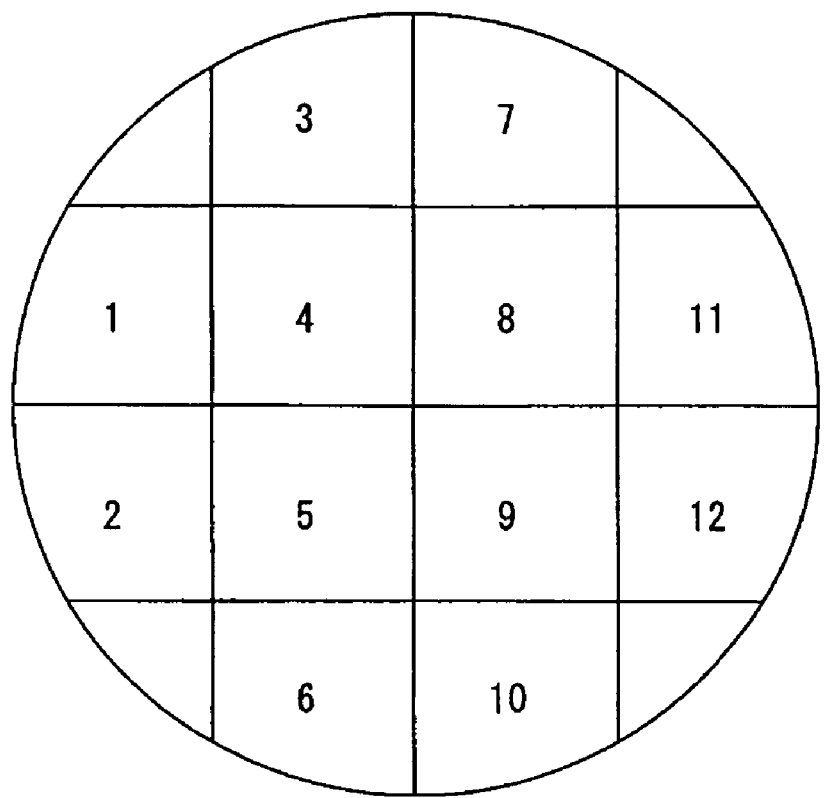
FIG. 6 is a schematic view showing the measurement point number at the time when a single measurement probe is each allocated to a region occupied by the end face of a single honeycomb fired body upon carrying out measurement of the shape of the honeycomb structured body in the longitudinal direction.

The shape in the longitudinal direction was measured by carrying out the inspecting of the shape employing the method for inspecting of the present invention, in regard to the honeycomb structured body manufactured by the above-mentioned procedure. Specifically, using the contact measurement apparatus 30 shown in FIGS. 5A and 5B, the length in the longitudinal direction, the degree of parallelism and the degree of position of each of five honeycomb structured body samples were measured by allocating a single measurement probe to each region occupied by the end face of a single honeycomb fired body in the end face of the honeycomb structured body. And, as shown in FIG. 6, the number of measurement points of a single inspection run when conducting inspection of the shape of one sample honeycomb structured body in the longitudinal direction is 12. A measurement result of a number identical to the number of measurement points is attained.

Moreover, FIG. 6 is a schematic view showing the measurement point number at the time when a single measurement probe is each allocated to a region occupied by the end face of a single honeycomb fired body upon carrying out measurement of the shape of the honeycomb structured body in the longitudinal direction.

Moreover, the value of each inspection item was sought in the following manner.

The length in the longitudinal direction was sought by measuring the distance between the face to which the contacting probe is in contact with and the reference surface.

The degree of parallelism was sought by calculating the difference between the maximum value and the minimum value among the measured values of the length in the longitudinal direction.

The degree of position was sought by calculating the mean value of the lengths in the longitudinal direction, calculating each absolute value of the differences of this mean value to the lengths in the longitudinal direction, and multiplying the maximum value of among these absolute values by 2.

The measurement results of each are shown in Table 1.

TABLE 1

| Inspection Item | | Sample No. | | | | |
|---|---|---|---|---|---|---|
| | | 1 | 2 | 3 | 4 | 5 |
| Length in the Longitudinal Direction [mm] | 1 | 254.09 | 253.98 | 254.08 | 254.20 | 254.24 |
| | 2 | 254.02 | 254.00 | 254.05 | 254.43 | 254.03 |
| | 3 | 254.03 | 253.97 | 253.95 | 254.27 | 254.03 |
| | 4 | 254.04 | 253.96 | 253.97 | 254.28 | 253.92 |
| | 5 | 253.99 | 253.98 | 253.97 | 254.55 | 253.94 |
| | 6 | 253.99 | 254.01 | 254.05 | 254.52 | 253.96 |
| | 7 | 253.99 | 254.01 | 253.96 | 254.18 | 254.09 |
| | 8 | 254.02 | 253.97 | 254.01 | 254.16 | 254.06 |
| | 9 | 253.97 | 253.97 | 254.00 | 254.39 | 254.08 |
| | 10 | 253.98 | 253.98 | 254.10 | 254.52 | 253.99 |
| | 11 | 254.00 | 253.97 | 254.02 | 254.26 | 254.10 |
| | 12 | 253.97 | 254.00 | 254.02 | 254.45 | 254.13 |
| Mean Value of the Length in the Longitudinal Direction [mm] | | 254.01 | 253.98 | 254.02 | 254.35 | 254.05 |
| Maximum Value of the Length in the Longitudinal Direction [mm] | | 254.09 | 254.01 | 254.10 | 254.55 | 254.24 |

TABLE 1-continued

| Inspection Item | Sample No. | | | | |
|---|---|---|---|---|---|
| | 1 | 2 | 3 | 4 | 5 |
| Minimum Value of the Length in the Longitudinal Direction [mm] | 253.97 | 253.96 | 253.95 | 254.16 | 253.92 |
| Degree of Parallelism [mm] | 0.12 | 0.05 | 0.15 | 0.39 | 0.32 |
| Degree of Position [mm] | 0.16 | 0.06 | 0.16 | 0.40 | 0.38 |

As can be clearly seen from Table 1, it was confirmed, upon carrying out measurement regarding the inspection items of the shape of each sample in the longitudinal direction, that while the degree of parallelism and the degree of position of sample No. 4 and sample No. 5 were both greater in comparison to those of samples No. 1 to 3, all samples were usable as product.

In this manner, through the method for inspecting a honeycomb structured body according to the embodiments of the present invention, it may become easier to acquire a multitude of data concerning the shape in the longitudinal direction in just one measurement. Moreover, because it may become easier to conduct inspection of the shape in the longitudinal direction (that is, the length in the longitudinal direction, the degree of parallelism and the degree of position) in only a single measurement by analyzing the data, it may become easier to shorten the amount of time required in the inspecting of the shape, and therefore it may become easier to improve the efficiency of the entire processes upon manufacturing a honeycomb structured body.

Comparative Example 1

A honeycomb structured body was photographed from the lateral direction and inspection was carried out on the shape in the longitudinal direction by analyzing the photographed image.

As a result, all samples were confirmed to be usable as product, without any detection of variance and the like as measured in Example 1.

Although the method for inspecting a fired honeycomb structured body has been mainly described up to this point, it may become easier to obtain the same effect even in the case of the honeycomb structured body before firing, such as after drying and after degreasing.

What is claimed as new and desired to be secured by Letters Patent of the United States is:

1. A method for manufacturing a honeycomb structured body, comprising:
   molding ceramic raw materials to manufacture a pillar-shaped honeycomb molded body having a multitude of cells placed in parallel in the longitudinal direction with a cell wall therebetween;
   firing said honeycomb molded body;
   bonding a plurality of said honeycomb fired bodies together by interposing an adhesive layer to manufacture a honeycomb structured body comprising an aggregated honeycomb structured body; and
   inspecting a shape of the honeycomb structured body, wherein the inspection of the shape of the honeycomb structured body comprises:
   measuring the shape of said honeycomb structured body in the longitudinal direction through the steps comprising:
   preparing a contact measurement member, the contact measurement member comprising
   a reference surface;
   two support members installed perpendicular to the reference surface;
   a measurement probe including a rail disposed perpendicular to said reference surface, a contacting probe configured to move along said rail, and a displacement gauge for measuring an amount of the movement of the contacting probe;
   a measuring probe support plate suspended parallel with the reference surface and positioned between the two support members and configured to ascend and descend along the two support members while maintaining being parallel with the reference surface probe in a direction perpendicular to said reference surface; and
   wherein the measurement probe includes a plurality of measurement probes supported by the measurement probe support plate and configured to penetrate through the measurement probe support plate;
   contacting a first end face of said honeycomb structured body with said reference surface; and
   moving said measurement probe in a direction toward said reference surface and perpendicular to said reference surface by moving said contacting probe along the rail of the measurement probe so that said contacting probe contacts with a second end face of said honeycomb structured body, wherein the contact measurement member is configured to have each measurement probe in contact with an end face of each honeycomb fired body on the second end face of said honeycomb structured body at the same time.

2. The method for manufacturing a honeycomb structured body according to claim 1, wherein an inspection item concerning the shape of said honeycomb structured body in the longitudinal direction includes at least one item selected from the group consisting of a length of the honeycomb structured body in the longitudinal direction, the degree of parallelism of the honeycomb structured body, and the degree of position of the honeycomb structured body.

3. The method for manufacturing a honeycomb structured body according to claim 1, wherein the shape of a tip of said contacting probe is a planar shape obtained by cutting the tip with a plane perpendicular to the length direction of said rail.

4. The method for manufacturing a honeycomb structured body according to claim 1, wherein the movement speed of said measurement probe upon moving said measurement probe in a direction nearing said reference surface is at least about 5 cm/s and at most about 50 cm/s.

5. The method for manufacturing a honeycomb structured body according to claim 1, wherein the measurement of the shape of the honeycomb structured body is carried out in a direction perpendicular to said longitudinal direction in addition to said longitudinal direction, by combining a plurality of said contact measurement members.

6. The method for manufacturing a honeycomb structured body according to claim 1, further comprising sealing the multitude of cells of either one of the first and second end faces with a plug material paste.

7. The method for manufacturing a honeycomb structured body according to claim 1, wherein the support member comprises a ball screw.

8. The method for manufacturing a honeycomb structured body according to claim 1, wherein measuring the shape of said honeycomb structured body in the longitudinal direction comprises:

preparing a contact measurement member;

carrying out a zero point adjustment of said contact measurement member by contacting one of end faces of a standard sample with said reference surface;

contacting, after the zero point adjustment, a first end face of said honeycomb structured body with said reference surface;

moving said measurement probe in the direction toward said reference surface only by an amount of $L-L_0$, said amount being obtained by subtracting a length $L_0$ of the longitudinal direction of the standard sample from a setting value L for a length of the longitudinal direction of said honeycomb structured body so that said contacting probe contacts with a second end face of said honeycomb structured body.

* * * * *

UNITED STATES PATENT AND TRADEMARK OFFICE
CERTIFICATE OF CORRECTION

| | | |
|---|---|---|
| PATENT NO. | : 7,922,963 B2 | Page 1 of 1 |
| APPLICATION NO. | : 11/651562 | |
| DATED | : April 12, 2011 | |
| INVENTOR(S) | : Toru Idei et al. | |

It is certified that error appears in the above-identified patent and that said Letters Patent is hereby corrected as shown below:

In claim 1, col. 26, lines 17-18, after "with the reference surface", delete "probe in a direction perpendicular to said reference surface; and".

Signed and Sealed this
Twenty-eighth Day of June, 2011

David J. Kappos
*Director of the United States Patent and Trademark Office*